(12) United States Patent
Yamada et al.

(10) Patent No.: US 10,910,907 B2
(45) Date of Patent: Feb. 2, 2021

(54) MOTOR

(71) Applicant: Nidec Corporation, Kyoto (JP)

(72) Inventors: Hiroki Yamada, Kyoto (JP); Atsushi Watashita, Kyoto (JP); Keisuke Kawata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 106 days.

(21) Appl. No.: 16/102,817

(22) Filed: Aug. 14, 2018

(65) Prior Publication Data

US 2019/0097488 A1 Mar. 28, 2019

(30) Foreign Application Priority Data

Sep. 26, 2017 (JP) ................. 2017-184774

(51) Int. Cl.
*H02K 7/08* (2006.01)
*G11B 19/20* (2006.01)
*H02K 5/16* (2006.01)
*H02K 7/00* (2006.01)

(52) U.S. Cl.
CPC ......... *H02K 5/165* (2013.01); *G11B 19/2009* (2013.01); *H02K 7/003* (2013.01); *H02K 7/086* (2013.01)

(58) Field of Classification Search
CPC ...... H02K 5/163; H02K 5/1735; H02K 7/003; H02K 7/085; H02K 7/086; H02K 1/187; H02K 1/2786; H02K 1/28; H02K 7/0085; G11B 19/20; G11B 19/2009; G11B 19/2018; G11B 19/2027; G11B 19/2036; G11B 19/2045

USPC ...... 310/67 R, 90, 156.12–156.15, 265, 266; 360/99.08, 99.16

See application file for complete search history.

(56) References Cited

U.S. PATENT DOCUMENTS

| | | | |
|---|---|---|---|
| 6,339,273 B1* | 1/2002 | Higuchi | H02K 1/30 310/91 |
| 6,501,617 B1* | 12/2002 | Harada | F16D 1/072 360/99.08 |
| 7,489,056 B2* | 2/2009 | Harada | B21K 25/00 29/522.1 |
| 7,667,360 B2* | 2/2010 | Fukushima | G11B 17/028 310/90 |
| 2004/0071504 A1* | 4/2004 | Harada | B21K 25/00 403/274 |
| 2005/0278938 A1* | 12/2005 | Harada | B21K 25/00 29/598 |
| 2009/0022043 A1* | 1/2009 | Uenosono | G11B 19/2036 369/255 |

(Continued)

*Primary Examiner* — Quyen P Leung
*Assistant Examiner* — Eric Johnson
(74) *Attorney, Agent, or Firm* — Keating & Bennett (57) ABSTRACT

A motor includes a shaft, a bearing that rotatably supports the shaft, and a hub fixed to the shaft. The shaft includes a first shaft portion extending in an axial direction, a second shaft portion projecting axially upward from an axially upper end surface of the first shaft portion and including a diameter smaller than that of the first shaft portion, and a screw hole recessed axially downward from the axially upper end surface. The hub includes a shaft fixing hole into and in which the second shaft portion is inserted and fixed. An outer surface of the second shaft portion includes a first region, and a second region axially above the first region, and including surface roughness smaller than that of the first region.

4 Claims, 7 Drawing Sheets

(56) References Cited

U.S. PATENT DOCUMENTS

| | | | |
|---|---|---|---|
| 2013/0140942 A1* | 6/2013 | Oh | H02K 1/30 |
| | | | 310/261.1 |
| 2013/0241332 A1* | 9/2013 | Kim | H02K 1/28 |
| | | | 310/90 |
| 2014/0265687 A1 | 9/2014 | Cheong et al. | |
| 2014/0285924 A1* | 9/2014 | Kim | F16C 17/105 |
| | | | 360/99.08 |
| 2016/0190875 A1* | 6/2016 | Takemoto | G11B 19/2009 |
| | | | 360/99.08 |

* cited by examiner

MOTOR

CROSS REFERENCE TO RELATED APPLICATIONS

This application claims the benefit of priority to Japanese Patent Application No. 2017-184774 filed on Sep. 26, 2017. The entire contents of this application are hereby incorporated herein by reference.

BACKGROUND OF THE INVENTION

1. Field of the Invention

The present invention relates to a motor.

2. Description of the Related Art

A hard disk is caused to rotate by, for example, a spindle motor described in JP-A 2014-180190. The spindle motor described in JP-A 2014-180190 includes a base member, a shaft, a thrust member, a rotating body, and a cover member. An outer diameter reduction part is formed on an upper end of the spindle motor. The thrust member is bonded to the outer diameter reduction part. An adhesive is applied to bond the thrust member to the outer diameter reduction part. The outer diameter reduction part has an adhesive groove formed at a lower end portion thereof and filled with the adhesive. The adhesive groove enables an increase in coupling force between the shaft and the thrust member.

In the spindle motor described in JP-A 2014-180190, the shaft has a screw hole formed at an upper end portion thereof. Since the screw hole is formed, a portion where the screw hole is formed is thin. When the adhesive groove is formed in the thin portion, the strength of the shaft may decrease.

SUMMARY OF THE INVENTION

Accordingly, preferred embodiments of the present invention provide motors that securely fix a rotatable hub to a shaft.

A motor according to a preferred embodiment of the present invention includes a shaft extending along a central axis in a vertical direction and rotatable about the central axis, a bearing that rotatably supports the shaft, and a hub fixed to the shaft. The shaft includes a first shaft portion extending in an axial direction, a second shaft portion projecting axially upward from an axially upper end surface of the first shaft portion and including a diameter smaller than that of the first shaft portion, and a screw hole recessed axially downward from the axially upper end surface. The hub includes a shaft fixing hole into and in which the second shaft portion is inserted and fixed. An outer surface of the second shaft portion includes a first region, and a second region located axially above the first region, and including a surface roughness smaller than that of the first region.

The motor according to the above preferred embodiment of the present invention is able to securely fix a rotatable hub to a shaft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
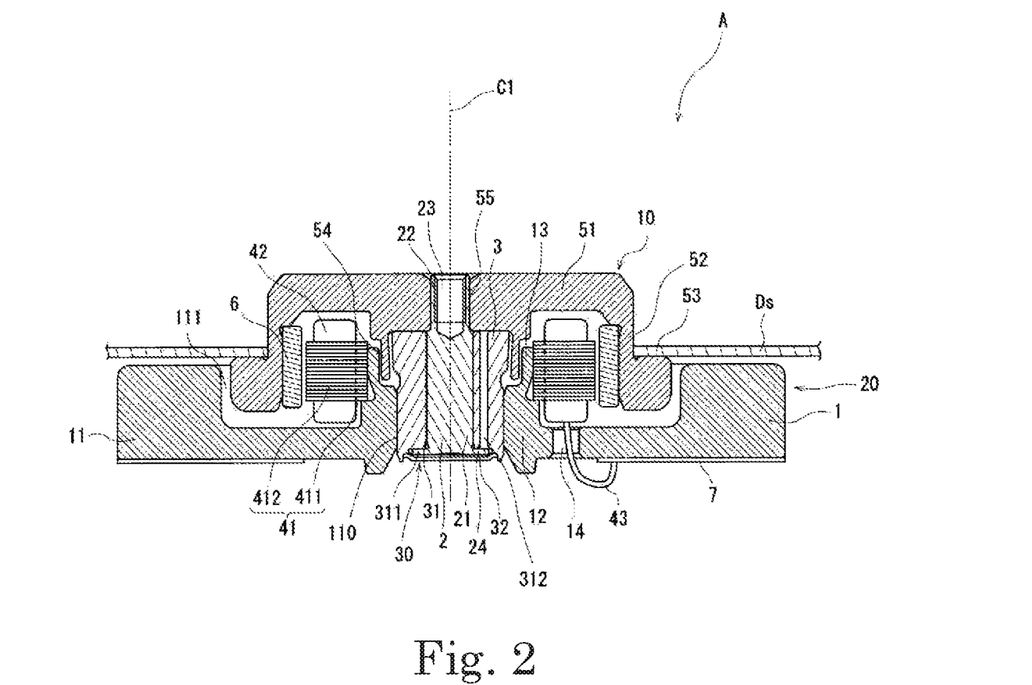
FIG. 2 is a sectional view of the motor illustrated in FIG. 1 taken along a plane including a central axis.

Hereinafter, preferred embodiments of the present invention will be described in detail with reference to the accompanying drawings. It is assumed herein that a direction parallel to a central axis C1 of a motor is referred to by the term "axial direction", "axial", or "axially", that directions perpendicular to the central axis C1 are each referred to by the term "radial direction", "radial", or "radially", and that a direction along a circular arc centered on the central axis C1 is referred to by the term "circumferential direction", "circumferential", or "circumferentially". It is also assumed herein that a motor A illustrated in FIG. 2 is used as a reference to define an upper side and a lower side in a vertical direction along the central axis C1, and the shape of each member or portion and relative positions of different members or portions will be described based on the above assumption. It should be noted, however, that the above definition of the vertical direction and the upper and lower sides is made simply for the sake of convenience in description, and is not meant to restrict relative positions or directions of different members or portions of the motor when in use.

Figure 1:
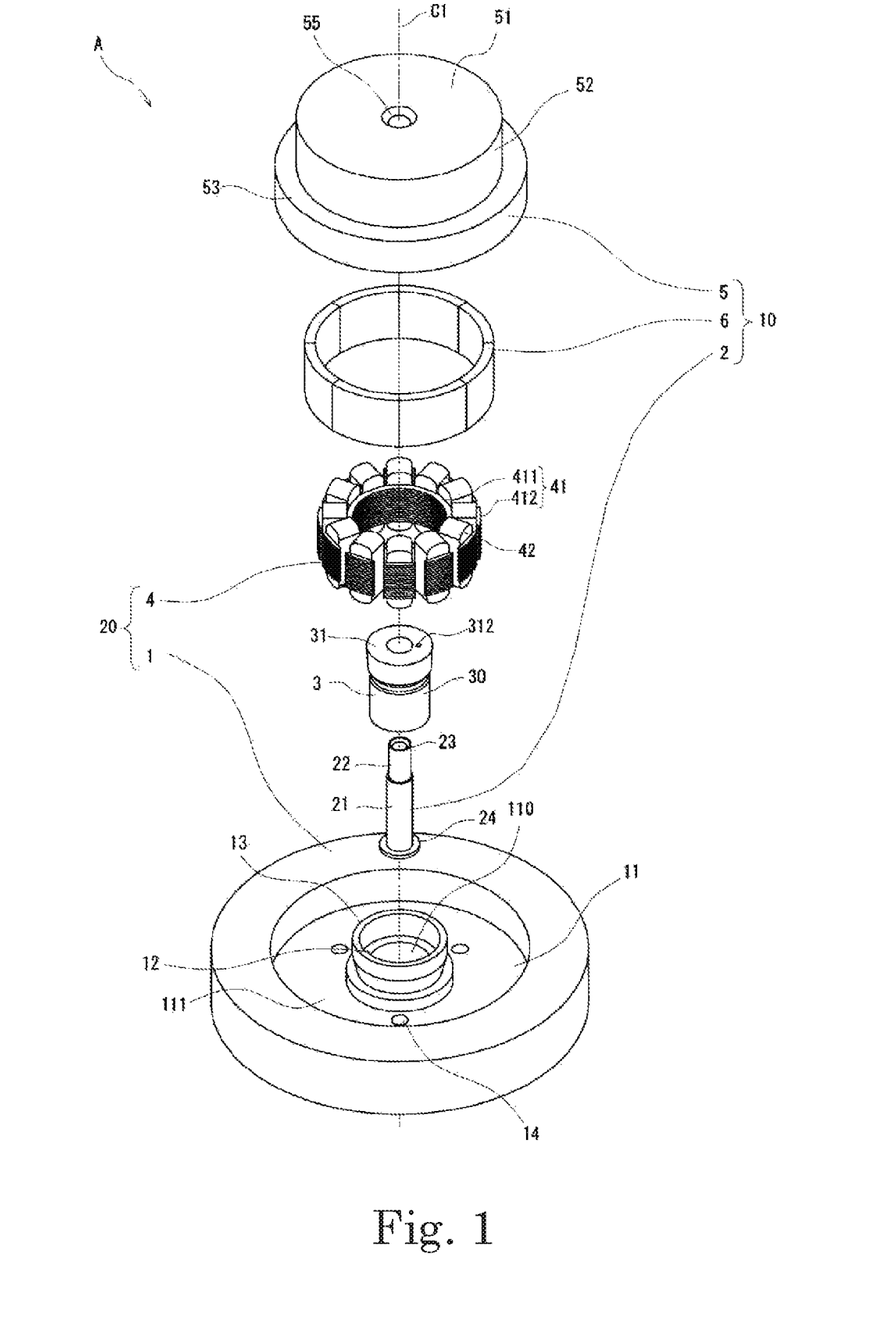
FIG. 1 is an exploded perspective view of a motor according to a preferred embodiment of the present invention.

Hereinafter, a preferred embodiment of the present invention will be described with reference to the accompanying drawings. FIG. 1 is an exploded perspective view of a motor according to a preferred embodiment of the present invention. FIG. 2 is a sectional view of the motor illustrated in FIG. 1 taken along a plane including a central axis. The motor A according to the present preferred embodiment is a so-called spindle motor arranged to rotate a disk-shaped recording disk Ds, such as, for example, a hard disk. In the motor A, a rotor portion 10 is supported through a bearing 30 to be rotatable with respect to a stator portion 20. That is, the rotor portion 10 is supported to be rotatable about the central axis C1 with respect to the stator portion 20.

Referring to FIGS. 1 and 2, the motor A according to the present preferred embodiment includes a base 1, a shaft 2, a sleeve 3, a stator 4, a hub 5, a rotor magnet 6, and a circuit board 7. The rotor portion 10 includes the shaft 2, the hub 5, and the rotor magnet 6. The stator portion 20 includes the base 1 and the stator 4. The bearing 30 includes the sleeve 3.

In the rotor portion 10, the shaft 2 is fixed to a central portion of the hub 5. In addition, the rotor magnet 6 is arranged inside of the hub 5, and both the shaft 2 and the rotor magnet 6 are centered on the central axis C1.

Referring to FIGS. 1 and 2, the shaft 2 is columnar. The shaft 2 includes a first shaft portion 21, a second shaft portion 22, a screw hole 23, and a flange portion 24. The shaft 2 is made of a metal. The shaft 2 is arranged to extend along the central axis C1. The shaft 2 is arranged to extend along the central axis extending in the vertical direction, and is arranged to rotate about the central axis C1.

The first shaft portion 21 is arranged to extend in an axial direction. The second shaft portion 22 is cylindrical, and is arranged axially above the first shaft portion 21. That is, the second shaft portion 22 is arranged to project axially upward from an axially upper end surface of the first shaft portion 21. The second shaft portion 22 is arranged to have a diameter smaller than that of the first shaft portion 21. The first and second shaft portions 21 and 22 are made of the same material, and are defined integrally with each other. The screw hole 23 is recessed downward from an axially upper surface of the shaft 2. That is, the screw hole 23 is recessed axially downward from an axially upper end surface of the shaft 2. An inner surface of the screw hole 23 includes a female screw. In addition, the flange portion 24 is arranged to extend radially outward at an axially lower end portion of the shaft 2. The flange portion 24 is in the shape of a disk.

The shaft 2 is fixed to the central portion of the hub 5. The hub 5 and the shaft 2 are arranged to rotate together. That is, the hub 5 is fixed to the shaft 2. Referring to FIGS. 1 and 2, the hub 5 includes a hub top plate portion 51, a hub tubular portion 52, a disk flange 53, a labyrinth projecting portion 54, and a shaft fixing hole 55.

The hub top plate portion 51 is arranged to extend radially. The hub top plate portion 51 is circular when viewed in the axial direction. The hub tubular portion 52 is arranged to extend axially downward from a radially outer edge of the hub top plate portion 51. The hub tubular portion 52 is cylindrical. The disk flange 53 is arranged to extend radially outward from an axially lower end portion of the hub tubular portion 52. The disk flange 53 is circular when viewed in the axial direction. The hub top plate portion 51, the hub tubular portion 52, and the disk flange 53 are made of the same material, and are molded integrally with each other.

An axially upper surface of the disk flange 53 is a flat surface perpendicular to the central axis C1. The disk Ds is arranged to be in contact with the axially upper surface of the disk flange 53. The disk Ds is then fixed to the hub 5. Thus, the disk Ds is fixed so as to be perpendicular to the central axis C1, i.e., a rotation axis. Then, rotation of the hub 5 causes the disk Ds to rotate. Note that, while the motor A according to the present preferred embodiment includes only one disk Ds, this is not essential to the present invention. In a motor according to another preferred embodiment of the present invention, a plurality of disks Ds may be fixed such that the disks Ds are spaced from one another in a direction parallel to the central axis C1. Even in this case, all the disks Ds are fixed so as to be perpendicular to the central axis C1.

The shaft fixing hole 55 is a through hole defined in a center of the hub top plate portion 51 when viewed in the axial direction, and arranged to pass through the hub top plate portion 51 in the axial direction. The second shaft portion 22 of the shaft 2 is inserted into and fixed in the shaft fixing hole 55. That is, the hub 5 includes the shaft fixing hole 55 into and in which the second shaft portion 22 is inserted and fixed. The second shaft portion 22 is fixed in the shaft fixing hole 55 through, for example, press fitting. Note that the fixing of the second shaft portion 22 in the shaft fixing hole 55 will be described in detail below.

The labyrinth projecting portion 54 is arranged to project downward from a lower surface of the hub top plate portion 51. The labyrinth projecting portion 54 is tubular, and the labyrinth projecting portion 54 is arranged to have an inside diameter greater than a diameter of the shaft fixing hole 55. Referring to FIG. 2, the labyrinth projecting portion 54 is arranged radially outward of a portion of an axially upper end portion of a sleeve body 31, which will be described below, of the bearing 30. The labyrinth projecting portion 54 and the hub top plate portion 51 are made of the same material, and are molded integrally with each other.

Referring to FIG. 2, the rotor magnet 6 is arranged on an inner surface of the hub tubular portion 52. The rotor magnet 6 is cylindrical, and is arranged to extend along the central axis C1. A radially inner surface of the rotor magnet 6 is arranged radially opposite to a radially outer surface of the stator 4 with a gap therebetween. The rotor magnet 6 includes a plurality of pairs of magnetic poles, each pair including a north pole and a south pole. The rotor magnet 6 may be defined by a cylindrical magnetic body including north and south poles arranged to alternate with each other in a circumferential direction, or alternatively, a plurality of magnets arranged in the circumferential direction may be used as the rotor magnet 6. The rotor magnet 6 is fixed inside of the hub tubular portion 52 through, for example, press fitting. Note that the method for fixing the rotor magnet 6 is not limited to the press fitting, and that adhesion, welding, a mechanical fixing method, and so on may be adopted to fix the rotor magnet 6. In the motor A according to the present preferred embodiment, the rotor magnet 6 includes eight magnetic poles.

The stator portion 20 includes the base 1 and the stator 4. The stator 4 is held by the base 1 such that the radially outer surface of the stator 4 is arranged radially opposite to the radially inner surface of the rotor magnet 6 of the rotor portion 10 with the gap therebetween.

Referring to FIGS. 1 and 2, the base 1 is a bottom portion arranged to cover an axially lower end of the motor A. The base 1 includes a base plate 11, a sleeve attachment portion 12, a stator holding portion 13, and lead wire insert holes 14. The base plate 11 is circular, that is, in the shape of a disk, when viewed in the axial direction. A base recessed portion 111 recessed axially downward is defined in an axially upper surface of the base plate 11. A section of the base recessed portion 111 which is perpendicular to the central axis C1 is circular, and an axially lower end portion of the hub 5 is rotatably accommodated in the base recessed portion 111. That is, the base recessed portion 111 is cylindrical, and the axially lower end portion of the hub 5 is arranged to rotate about the central axis C1 inside of the base recessed portion 111.

Note that, although the base plate 11 of the base 1 is in the shape of a disk in the present preferred embodiment, the base plate 11 may not necessarily be in the shape of a disk. For example, the base 1 may alternatively be in the shape of a polygon, such as, for example, a quadrilateral or a hexagon, or in the shape of an ellipse or the like, when viewed in the axial direction. A wide variety of shapes may be adopted for the base 1 in accordance with a device to which the motor A is to be attached. Also note that the base recessed portion 111 may not necessarily be cylindrical, but may alternatively be in any other desirable shape that allows the axially lower end portion of the hub 5 to be rotatably accommodated therein.

A through hole 110, which is arranged to pass through the base plate 11 in the axial direction, is defined in a center of the base plate 11. The sleeve attachment portion 12 is cylindrical, and is arranged to project axially upward from a periphery of the through hole 110. The sleeve attachment portion 12 and the base plate 11 may be made of the same material and be defined integrally with each other, or alternatively, the sleeve attachment portion 12 may be a member separate from the base plate 11 and fixed to the base plate 11. Notice that, in the motor A, the through hole 110 is in a center of the base recessed portion 111.

The sleeve body 31, which will be described below, of the bearing 30 is arranged to be in contact with, and is fixed to, an inner surface of the sleeve attachment portion 12. The stator holding portion 13 is a tubular portion arranged to project axially upward from an axially upper surface of the sleeve attachment portion 12. The stator holding portion 13 is arranged to be in contact with an inner surface of a stator core 41, which will be described below, of the stator 4 to hold the stator 4. As illustrated in FIG. 2, an axially lower side of the stator 4 may be arranged to be in contact with a radially outer surface of the sleeve attachment portion 12. That is, at least a portion of the stator 4 is held by the stator holding portion 13.

Each lead wire insert hole 14 is arranged at the base recessed portion 111. The lead wire insert hole 14 is a through hole arranged to pass through the base plate 11 in the axial direction. Lead wires 43, which are connected to coils 42 of the stator 4, which will be described below, are inserted into the lead wire insert holes 14. In addition, the circuit board 7 is attached to an axially lower surface of the base 1. Each lead wire 43 is inserted into the corresponding lead wire insert hole 14 through an axially upper opening thereof, and is drawn out of the corresponding lead wire insert hole 14 through an axially lower opening thereof. The lead wire 43 drawn out is then connected to the circuit board 7. Note that, although the number of lead wire insert holes 14 is three in the present preferred embodiment, only one lead wire insert hole may be provided in another preferred embodiment of the present invention.

The stator 4 is held by the stator holding portion 13 of the base 1. The stator 4 includes the stator core 41, the coils 42, and the lead wires 43.

The stator core 41 is defined by laminated silicon steel sheets. Referring to FIG. 1, the stator core 41 includes an annular core back portion 411 and tooth portions 412. Referring to FIG. 2, the stator core 41 is defined by plate-shaped members placed one upon another in the axial direction. That is, the stator core 41 is a laminated body. Note, however, that this is not essential to the present invention.

The core back portion 411 is annular, and is arranged to extend in the axial direction. An inner surface of the core back portion 411 is arranged to be in contact with the outer surface of the stator holding portion 13, so that the core back portion 411, hence the stator 4, is held by the stator holding portion 13. The stator holding portion 13 and the core back portion 411 are fixed to each other through press fitting. Note that other fixing methods than the press fitting, such as adhesion, deposition, welding, and the like, may be widely adopted to securely fix the stator holding portion 13 and the core back portion 411 to each other.

Each tooth portion 412 is arranged to project radially outward from a radially outer surface of the core back portion 411. The stator core 41 includes twelve of the tooth portions 412. The tooth portions 412 are arranged at regular intervals in the circumferential direction. That is, the stator 4 has twelve slots. The motor A according to the present preferred embodiment includes the rotor magnet 6 with eight magnetic poles, and the stator 4 with twelve slots. That is, the motor A is an outer-rotor motor having eight poles and twelve slots.

Each tooth portion 412 of the stator core 41 is covered with an insulator, which is not shown. Each tooth portion 412 covered with the insulator has one of the coils 42 defined by a conducting wire wound therearound. The insulator provides isolation between the stator core 41 and each coil 42. The coil 42 is arranged around each of the tooth portions 412 of the stator core 41. That is, the stator 4 includes twelve of the coils 42. The twelve coils 42 included in the stator 4 are divided into three groups (hereinafter referred to as three phases) which differ in timing of supply of an electric current. The three phases are defined as a U phase, a V phase, and a W phase, respectively. That is, the stator 4 includes four U-phase windings, four V-phase windings, and four W-phase windings. Hereinafter, the windings of the three phases will be simply referred to collectively as the coils 42.

The lead wires 43 are arranged to electrically connect the coils 42 of the U, V, and W phases to a circuit (not shown) mounted on the circuit board 7. Referring to FIG. 2, each lead wire 43 is drawn out downwardly from an axially lower side of the stator 4. The lead wire 43 is then passed through the corresponding lead wire insert hole 14 of the base 1 to be drawn out downwardly of the base 1, and is electrically connected to a wiring pattern (not shown) on the circuit board 7. Each lead wire 43 is connected to the wiring pattern through soldering. Note, however, that each lead wire 43 may be connected to the wiring pattern using a connection member, such as, for example, a connector, instead of through the soldering.

Next, the bearing 30, which is arranged to support the rotor portion 10 such that the rotor portion 10 is rotatable with respect to the stator portion 20, will now be described below. The bearing 30 is a fluid dynamic bearing using a fluid. The bearing 30 is arranged to rotatably support the shaft 2. The bearing 30 includes the sleeve body 31 and a seal cap 32. Each of the sleeve body 31 and the seal cap 32 is made of, for example, stainless steel or the like. The sleeve body 31 and the seal cap 32 together define the sleeve 3.

The sleeve body 31 is cylindrical, and is centered on the central axis C1. The sleeve body 31 has, at a lower end portion thereof, a shoulder portion 311 recessed upward. The flange portion 24 of the shaft 2 is accommodated inside of the shoulder portion 311. In addition, the seal cap 32 is attached to the shoulder portion 311 to cover a lower side of the flange portion 24. The seal cap 32 is fixed by a fixing method using an adhesive or the like.

The sleeve body 31 includes a circulation hole 312 arranged to pass therethrough in the axial direction at a position radially outward of the central axis C1. The circulation hole 312 is in communication with a gap between the seal cap 32 and the shoulder portion 311 at the lower portion of the sleeve body 31.

Minute gaps are defined between an inner circumferential surface of the sleeve body 31 and an outer circumferential surface of the shaft 2, between the sleeve body 31 and an upper surface and an outer circumferential surface of the flange portion 24, and between an upper surface of the seal cap 32 and a lower surface of the flange portion 24. A lubricating oil as the fluid is continuously arranged in these minute gaps. Thus, the bearing 30 of the motor A is defined by the sleeve body 31, the seal cap 32, the shaft 2, and the lubricating oil.

The flange portion 24 and a portion of the shaft 2 which is radially opposite to an inner surface of the sleeve body 31 include grooves defined therein. When the shaft 2 rotates, these grooves produce dynamic pressures in the lubricating oil. The dynamic pressures cause the lubricating oil to circulate through the gap between the inner surface of the sleeve body 31 and the outer surface of the shaft 2 and a gap between an axially upper end surface of the sleeve body 31 and the axially lower surface of the hub top plate portion 51 of the hub 5. As a result, the shaft is supported through the lubricating oil while being out of contact with the sleeve body 31, allowing the rotor portion 10 to rotate with respect to the stator portion 20 with high precision and reduced noise.

That is, the bearing 30 includes a so-called radial bearing which includes the lubricating oil circulating through the gap between the outer surface of the shaft 2 and the sleeve body 31, and which is arranged to support rotation of the shaft 2. In addition, the bearing 30 includes a so-called thrust bearing which includes the lubricating oil circulating through the gap between the sleeve body 31 and the axially lower surface of the hub top plate portion 51, and which is arranged to support the shaft 2 in the axial direction.

The motor A according to the present preferred embodiment has the above-described structure. Next, important portions of the motor A according to the present preferred embodiment will now be described below with reference to the accompanying drawings.

Figure 3:
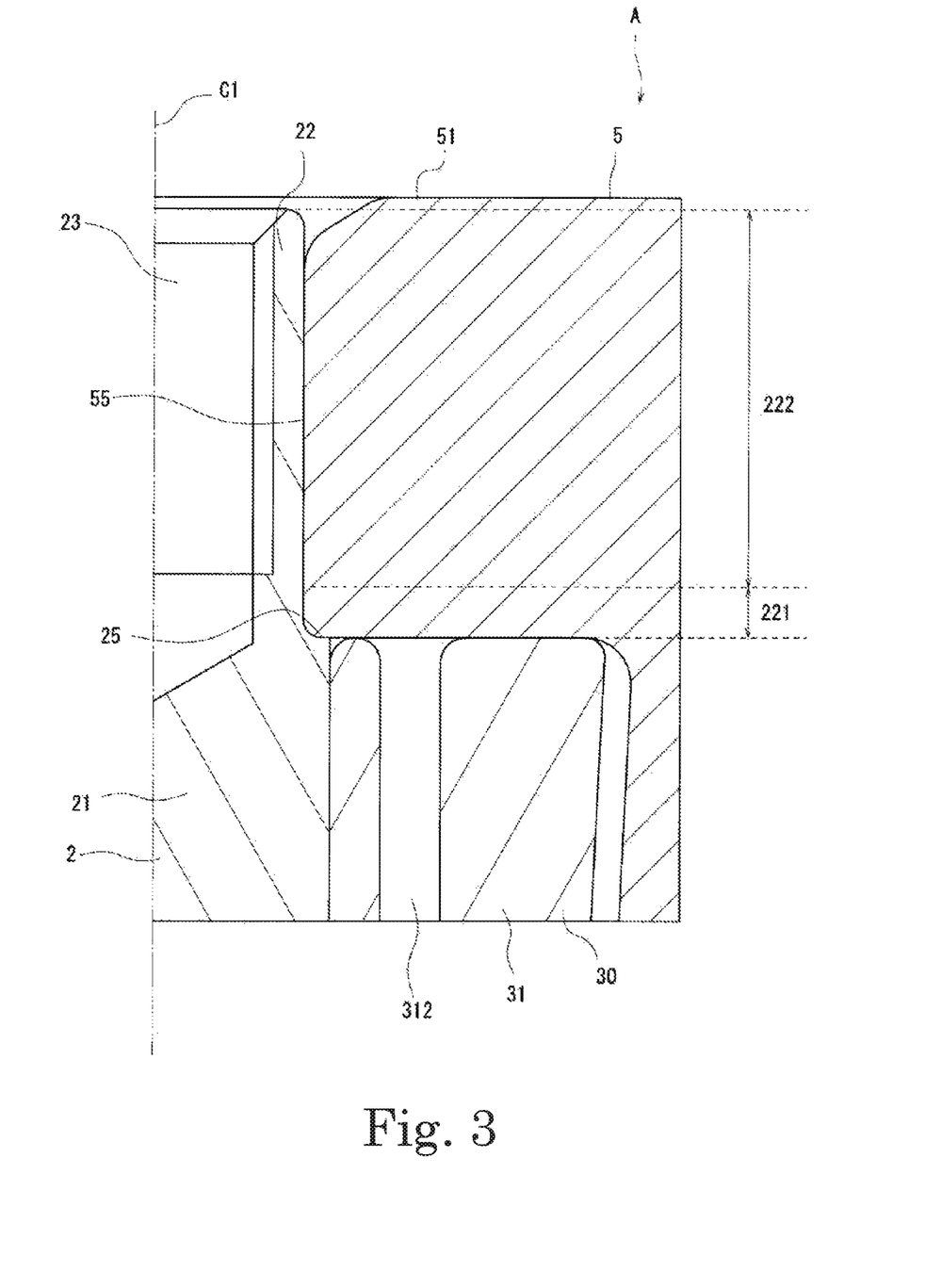
FIG. 3 is a sectional view illustrating an area where a shaft and a hub of the motor according to a preferred embodiment of the present invention are fixed to each other in an enlarged form.

FIG. 3 is a sectional view illustrating an area where the shaft and the hub of the motor according to a first preferred embodiment of the present invention are fixed to each other in an enlarged form. In FIG. 3, the second shaft portion 22 of the shaft 2 and the shaft fixing hole 55 of the hub 5 of the motor A are shown in an enlarged form. Referring to FIG. 3, in the shaft 2, the second shaft portion 22 is arranged axially above the first shaft portion 21. The shaft 2 also includes a shoulder portion 25 connecting the first shaft portion 21 to the second shaft portion 22 and including a plane perpendicular to the central axis C1. The shoulder portion 25 is a boundary portion between the first shaft portion 21 and the second shaft portion 22 and is also an axially upper end surface of the first shaft portion 21.

Referring to FIG. 3, the screw hole 23 is formed radially inside of the second shaft portion 22. That is, the first shaft portion 21 is columnar, and the second shaft portion 22 is cylindrical. A radially outer surface of the second shaft portion 22 includes a first region 221 and a second region 222. In the second shaft portion 22, the first region 221 and the second region 222 are arranged to be axially adjacent to each other. The second region 222 is arranged axially above the first region 221. The second region 222 is arranged to have surface roughness smaller than that of the first region 221. That is, the outer surface of the second shaft portion 22 includes the first region 221, and the second region 222 arranged axially above the first region 221 and arranged to have surface roughness smaller than that of the first region 221.

For example, the shaft 2 is subjected to surface treatment that involves bringing a tool into contact with the outer surface of the second shaft portion 22 while causing the shaft 2 to rotate axially, and polishing the outer surface to make the surface roughness small. The screw hole 23 is formed radially inside of the second shaft portion 22. The second shaft portion 22 is cylindrical. The shaft 2 according to the present preferred embodiment is subjected to surface treatment for the outer surface of the second shaft portion 22 in such a manner as to polish the second region 222 axially above the first region 221 near the shoulder portion 25. This makes it possible to suppress contact of the tool for polishing with the shoulder portion 25 during the surface treatment.

In addition, since a part of the outer surface of the second shaft portion 22 is polished, an annular recess recessed radially, i.e., a so-called undercut is not formed in the vicinity of the shoulder portion 25. Therefore, the cylindrical second shaft portion 22 is less susceptible to concentration of stress, which makes it possible to suppress reduction in strength of the shaft 2.

The second shaft portion 22 of the shaft 2 is press fitted into the shaft fixing hole 55 of the hub 5. At this time, the second region 222 with smaller surface roughness is inserted prior to the first region 221 with larger surface roughness into the shaft fixing hole 55. This makes it possible to enhance positional accuracy, which depends on the surface roughness of the shaft 2, of the shaft 2 in the radial and axial directions of the shaft 2 in the press fitting. This also makes it possible to position the hub 5 in the axial direction with respect to the shaft 2 by bringing a periphery of the shaft fixing hole 55 of the hub 5, i.e., the lower surface of the hub top plate portion 51 into contact with the shoulder portion 25 of the shaft 2. As described above, the relative positions of the shaft 2 and hub 5 in the radial and axial directions can be set with good accuracy in such a manner that the second shaft portion 22 is press fitted into the shaft fixing hole 55.

Figure 4:
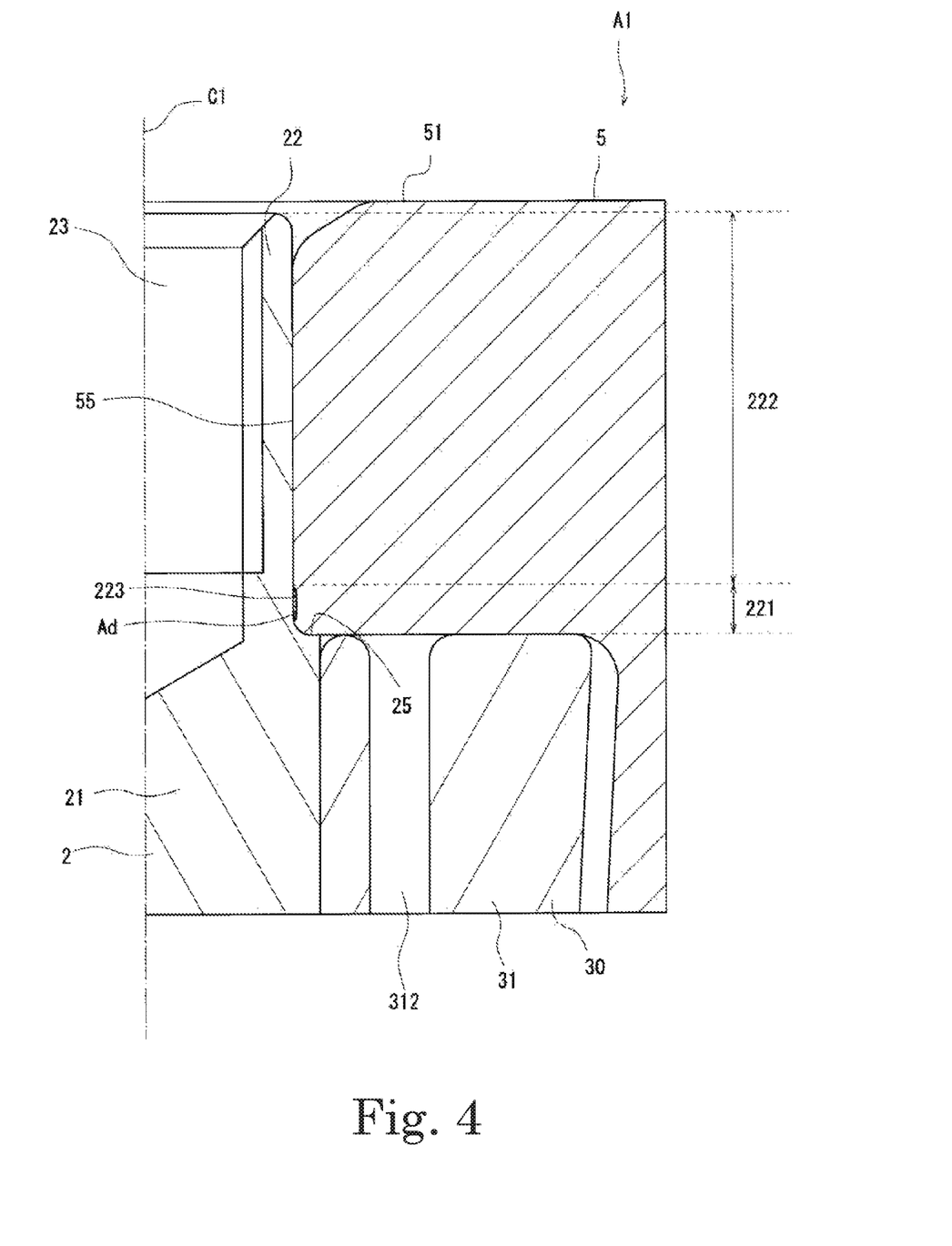
FIG. 4 is a sectional view illustrating an area where a shaft and a hub of a motor according to another preferred embodiment of the present invention are fixed to each other in an enlarged form.

FIG. 4 is a sectional view illustrating an area where a shaft and a hub of a motor according to a modification of the first preferred embodiment of the present invention are fixed to each other in an enlarged form. In a motor A1 illustrated in FIG. 4, a second shaft portion 22 includes an axially lower first region 221 and an axially upper second region 222. The first region 221 is arranged to have surface roughness larger than that of the second region 222. That is, the first region 221 has a roughened surface. Therefore, when the second shaft portion 22 is fixed in a shaft fixing hole 55 of a hub 5, a gap is prone to being defined between a shoulder portion 25 and the first region 221 on an outer surface of the second shaft portion 22. Hence, a first adhesive region 223 may be provided in such a manner that the gap between the first region 221 of the second shaft portion 22 and an inner surface of the shaft fixing hole 55 is filled with an adhesive Ad for adhesion of the first region 221 to the shaft fixing hole 55. That is, the first region 221 includes the first adhesive region 223 where the adhesive Ad is placed. The first adhesive region 223 on the first region 221 formed with a large number of gaps between the first region 211 and the shaft fixing hole 55 makes it possible to securely fix the first region 221 to the inner surface of the shaft fixing hole 55 by adhesion.

Note that the first adhesive region 223 is formed on the first region 221 in such a manner that the adhesive Ad is applied to the shaft fixing hole 55 in advance and the shaft 2 is then press fitted into the shaft fixing hole 55. However, this is not essential to the present invention. Alternatively, the first adhesive region 223 may be formed on the first region 221 in such a manner that the adhesive Ad is applied to the outer surface of the second shaft portion 22 and the shaft 2 is then press fitted into the shaft fixing hole 55. Alternatively, the entire first region 221 may serve as the first adhesive region 223 or a part of the first region 221 may serve as the first adhesive region 223.

Figure 5:
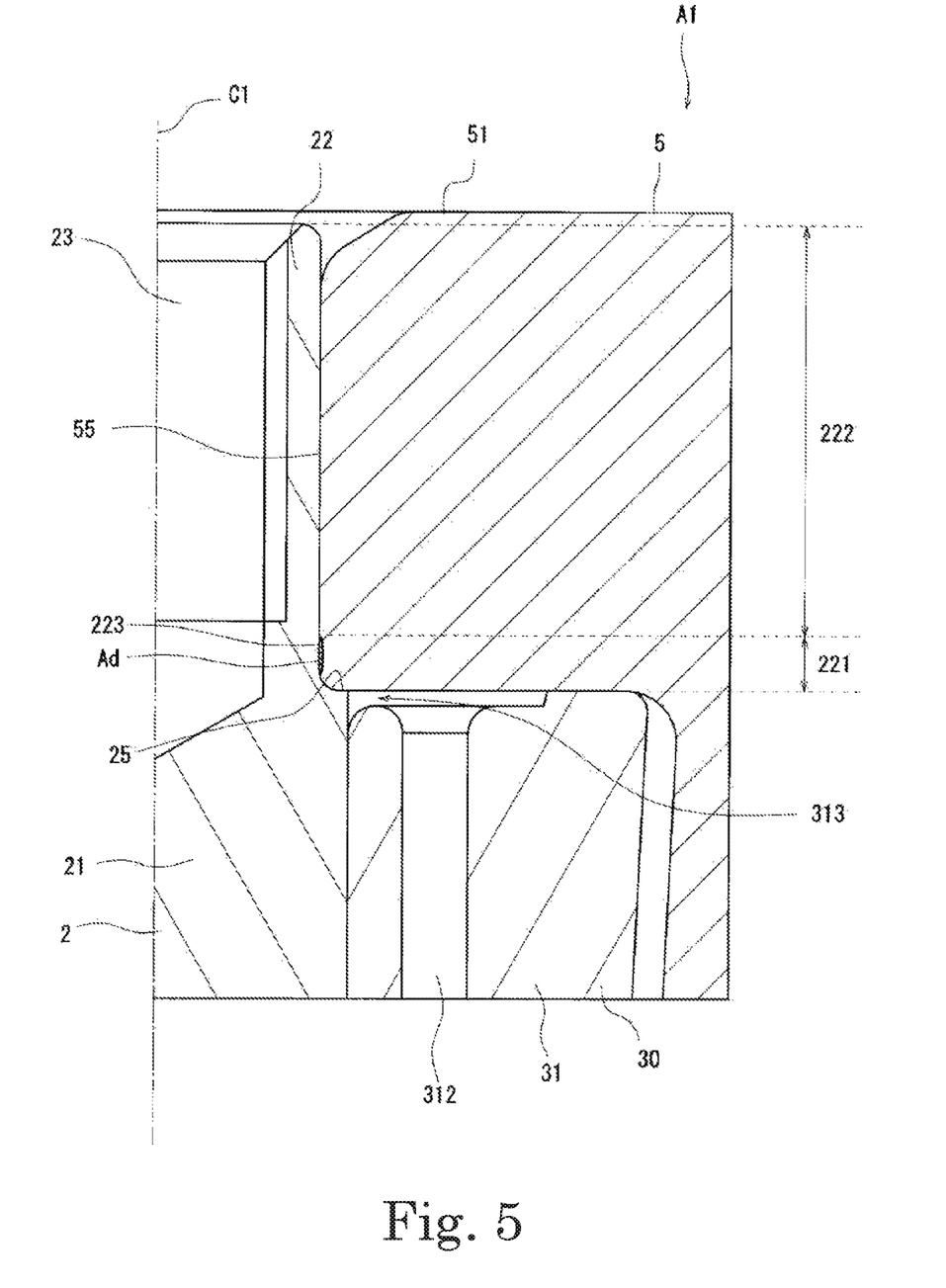
FIG. 5 is a sectional view illustrating an area where a shaft and a hub of a motor according to yet another preferred embodiment of the present invention are fixed to each other in an enlarged form.

In addition, a space where an excessive adhesive is storable may be defined by curving an upper portion of a sleeve body 31. This space is surrounded with the sleeve body 31, the first shaft portion 21, and the hub top plate portion 51. Referring to FIG. 5, specifically, a gap 313 may be defined on a radially inner end between the upper portion of the sleeve body 31 and the hub top plate portion 51. In this case, the upper portion of the sleeve body 31 is out of contact with the hub top plate portion 51. This makes it possible to store an excessive adhesive in the gap 313 and to enhance positional accuracy of the shaft 2 in the radial and axial directions with respect to the hub 5.

Figure 6:
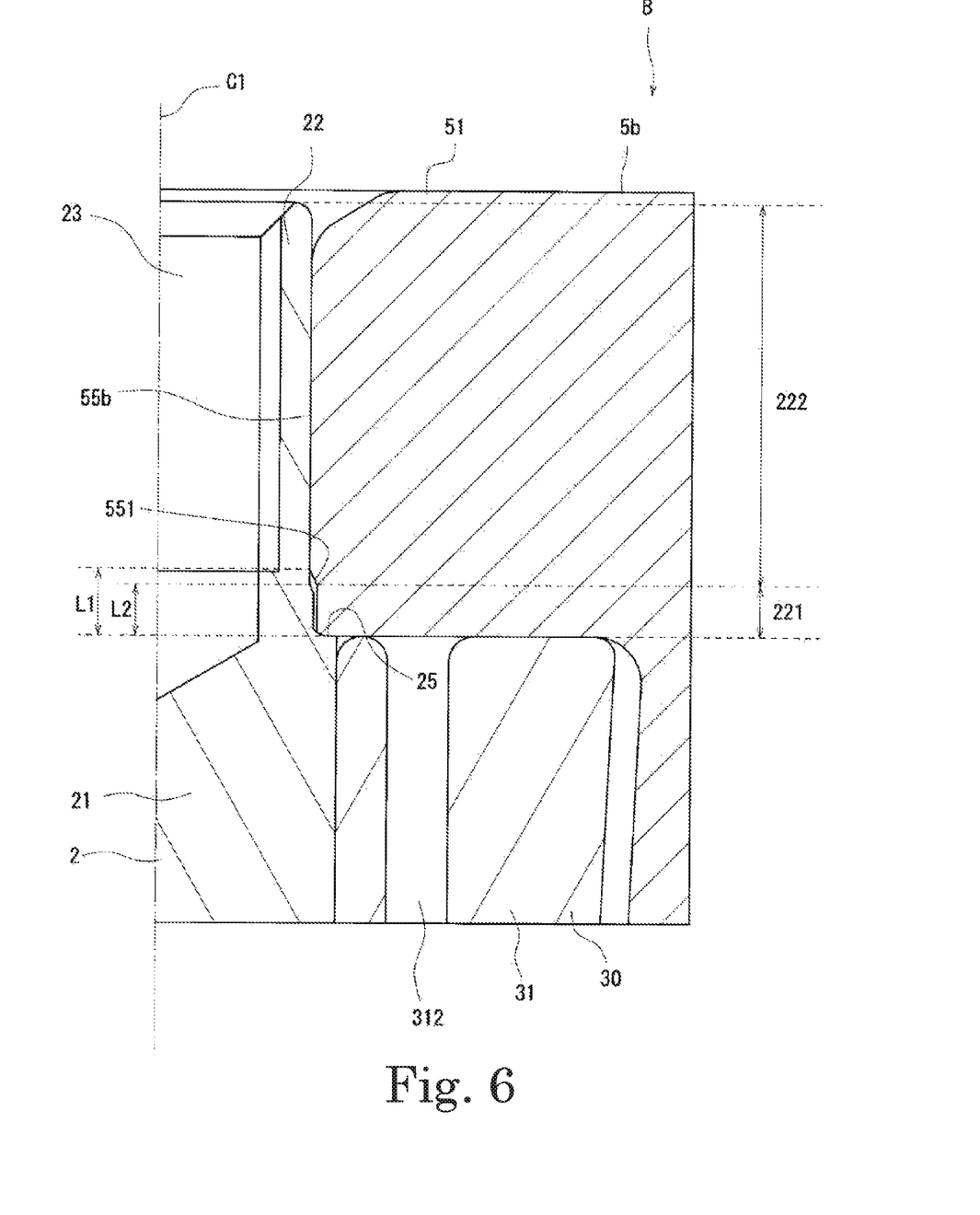
FIG. 6 is a sectional view illustrating an area where a shaft and a hub of a motor according to yet another preferred embodiment of the present invention are fixed to each other in an enlarged form.

A motor according to a second preferred embodiment of the present invention will now be described below with reference to the accompanying drawings. FIG. 6 is a sectional view illustrating an area where a shaft and a hub of the motor according to the second preferred embodiment of the present invention are fixed to each other in an enlarged form. A motor B according to the present preferred embodiment includes a hub 5b. The hub 5b includes a shaft fixing hole 55b provided with a hub recessed portion 551. The motor B is similar in structure to the motor A according to the first preferred embodiment except in the hub recessed portion 551. Accordingly, portions of the motor B which have their equivalents in the motor A are denoted by the same reference numerals as those of their equivalents in the motor A, and detailed descriptions of such portions will be omitted.

Referring to FIG. 6, a second shaft portion 22 includes a first region 221 and a second region 222. The first region 221 is arranged to have a maximum outside diameter larger than that of the second region 222. In the hub 5b, the hub recessed portion 551 recessed radially outward is arranged axially below the shaft fixing hole 55b. The shaft fixing hole 55b including the hub recessed portion 551 is arranged to have an axial projection surface larger than that of a first shaft portion 121. That is, the axial projection surface of the first region 221 is located inside the axial projection surface of the shaft fixing hole 55b including the hub recessed portion 551. In addition, the hub recessed portion 551 is arranged to have an axial length L1 longer than an axial length L2 of the first region 221 on the second shaft portion 22 of the shaft 2. That is, an inner surface of the shaft fixing hole 55b has the hub recessed portion 551 at a position radially overlapping with at least the first region 221. In the second shaft portion 22, the maximum outside diameter of the first region 221 is larger than the maximum outside diameter of the second region 222, and the axial projection surface of the first region 221 is located inside the axial projection surface of the hub recessed portion 551. Further, the axial length L1 of the hub recessed portion 551 is longer than the axial length L2 of the first region 221.

The second shaft portion 22 is press fitted into the shaft fixing hole 55b of the hub 5b. At this time, the second region 222 on the outer surface of the second shaft portion 22 is press fitted to an axially upper side of the shaft fixing hole 55b. In addition, the first region 221 is arranged at a position radially overlapping with the hub recessed portion 551 axially below the shaft fixing hole 55b. Since the axial length L1 of the hub recessed portion 551 is longer than the axial length L2 of the first region 221, the first region 221 is located inside the hub recessed portion 551. This suppresses contact of the first region 221 with the hub recessed portion 551, i.e., the inner surface of the shaft fixing hole 55b. This improves productivity to press fit the second shaft portion 22 into the shaft fixing hole 55b of the hub 5b.

Note that the first adhesive region 223 where the adhesive Ad is placed may be provided between the first region 221 and the hub recessed portion 551.

Figure 7:
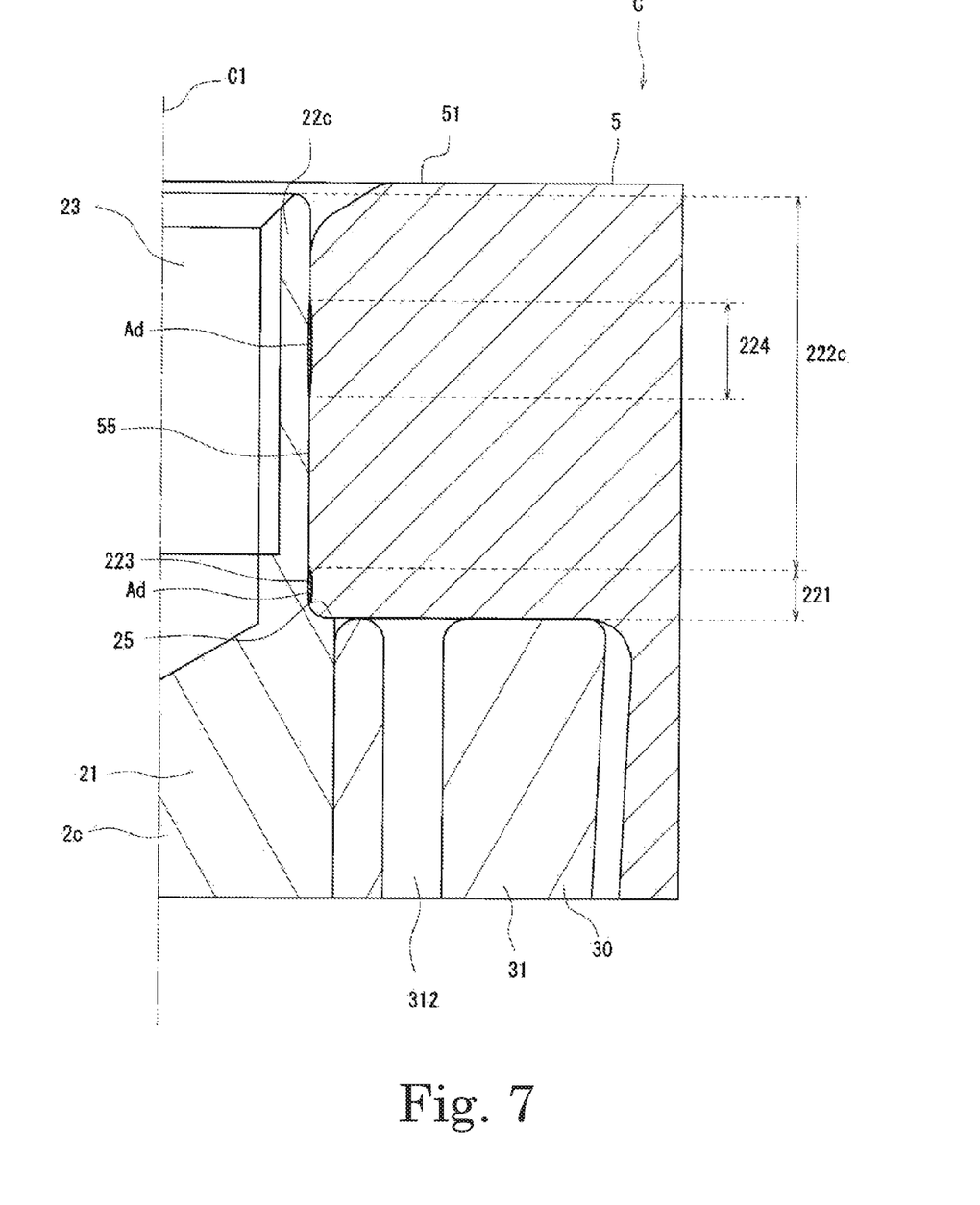
FIG. 7 is a sectional view illustrating an area where a shaft and a hub of a motor according to yet another preferred embodiment of the present invention are fixed to each other in an enlarged form.

A motor according to a third preferred embodiment of the present invention will now be described below with reference to the accompanying drawings. FIG. 7 is a sectional view illustrating an area where a shaft and a hub of the motor according to the third preferred embodiment of the present invention are fixed to each other in an enlarged form. A motor C according to the present preferred embodiment includes a shaft 2c. The shaft 2c includes a second shaft portion 22c. The second shaft portion 22 includes a second region 222c a part of which is a second adhesive region 224. The motor C is similar in structure to the motor A according to the first preferred embodiment except in the second adhesive region 224. Accordingly, portions of the motor C which have their equivalents in the motor A are denoted by the same reference numerals as those of their equivalents in the motor A, and detailed descriptions of such portions will be omitted.

Referring to FIG. 7, the motor C includes the annular second adhesive region 224 formed on a part of the second shaft portion 22c in the axial direction. The second adhesive region 224 is formed on an axially middle portion of the second region 222c on the second shaft portion 22c. That is, the second region 222c includes, at the axially middle portion thereof, the second adhesive region 224 where an adhesive Ad is placed. In press fitting the second shaft portion 22c into a shaft fixing hole 55, a gap between the second adhesive region 224 on the second shaft portion 22c and an inner surface of the shaft fixing hole 55 is filled with the adhesive Ad for adhesion of the second adhesive region 224 to the shaft fixing hole 55. In the second region 222c, the second adhesive region 224 is thus fixed in the shaft fixing hole 55 with the adhesive Ad. In addition, axially opposite ends of the second adhesive region 224 in the second region 222c are fixed in the shaft fixing hole 55 through press fitting. The second region 222c is thus securely fixed in the shaft fixing hole 55 by adhesion and through press fitting. Even when one of the fixing through press fitting and the fixing by adhesion is unsatisfactory, the second region 222c is fixed in the shaft fixing hole 55 through press fitting or by adhesion. This makes it possible to suppress separation of the shaft 2c from the hub 5.

Note that the second adhesive region 224 on the second shaft portion 22c of the shaft 2c may include a recessed portion recessed radially outward of the remaining portion of the second region 222c. The recessed portion facilitates placement of the adhesive Ad, which makes it possible to securely fix the second region 222c to the shaft fixing hole 55 by adhesion.

The second adhesive region 224 is formed on the second region 222c in such a manner that the adhesive Ad is applied to the shaft fixing hole 55 in advance and the shaft 2c is then press fitted into the shaft fixing hole 55. However, this is not essential to the present invention. Alternatively, the second adhesive region 224 may be formed on the second region 222c in such a manner that the adhesive Ad is applied to the outer surface of the second shaft portion 22c and the shaft 2c is then press fitted into the shaft fixing hole 55.

While preferred embodiments of the present invention have been described above, it will be understood that the preferred embodiments may be modified in various manners without departing from the scope and spirit of the present invention.

Preferred embodiments of the present invention are applicable to, for example, motors arranged to drive storage apparatuses, such as hard disk apparatuses, optical disk apparatuses, and the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a shaft extending along a central axis in a vertical direction, and rotatable about the central axis;
    a bearing that rotatably supports the shaft; and
    a hub fixed to the shaft, the hub including an upper end surface which is located axially above an axially uppermost end surface of the shaft; wherein
    the shaft includes:
    a first shaft portion extending in an axial direction;
    a second shaft portion projecting axially upward from an axially upper end surface of the first shaft portion, and including a diameter smaller than that of the first shaft portion; and
    a screw hole recessed axially downward from the axially upper end surface;
    the hub includes a shaft fixing hole into which the second shaft portion is inserted and fixed, an upper opening of the shaft fixing hole including an inclined surface which is at least partially located axially above the axially uppermost end surface of the shaft and which is inclined axially downward;
    an outer surface of the second shaft portion includes:
    a first region; and
    a second region located axially above the first region, and including a surface roughness smaller than that of the first region;
    the first region includes a first adhesive region including an adhesive;
    an inner surface of the shaft fixing hole includes a hub recessed portion at a position radially overlapping with at least the first region; and
    the hub recessed portion is defined by a space which radially separates the hub recessed portion from the outer surface of the second shaft portion.

2. The motor according to claim 1, wherein in the second shaft portion, a maximum outside diameter of the first region is larger than a maximum outside diameter of the second region, and an axial projection surface of the first region is located inside an axial projection surface of the hub recessed portion.

3. The motor according to claim 1, wherein an axial length of the hub recessed portion is longer than an axial length of the first region.

4. The motor according to claim 1, wherein the second region includes, at an axially middle portion thereof, a second adhesive region where an adhesive is located.

* * * * *